US012067988B2

(12) United States Patent
Klug et al.

(10) Patent No.: US 12,067,988 B2
(45) Date of Patent: Aug. 20, 2024

(54) DETECTION DEVICE FOR A VOICE SIGNAL OF A PERSON, AND METHOD FOR DETECTING A VOICE SIGNAL OF A PERSON USING SUCH A DETECTION DEVICE

(71) Applicant: AUDI AG, Ingolstadt (DE)

(72) Inventors: Markus Klug, Ingolstadt (DE); Tobias Moll, Ingolstadt (DE); Johannes Scheuchenpflug, Baar-Ebenhausen (DE)

(73) Assignee: AUDI AG, Ingolstadt (DE)

( * ) Notice: Subject to any disclaimer, the term of this patent is extended or adjusted under 35 U.S.C. 154(b) by 471 days.

(21) Appl. No.: 17/608,386

(22) PCT Filed: Apr. 30, 2020

(86) PCT No.: PCT/EP2020/062114

§ 371 (c)(1),
(2) Date: Nov. 2, 2021

(87) PCT Pub. No.: WO2020/225124

PCT Pub. Date: Nov. 12, 2020

(65) Prior Publication Data

US 2022/0208193 A1 Jun. 30, 2022

(30) Foreign Application Priority Data

May 3, 2019 (DE) ................ DE10 2019 206 371.3

(51) Int. Cl.
*G10L 15/24* (2013.01)
*G01S 7/4865* (2020.01)
(Continued)

(52) U.S. Cl.
CPC ............ *G10L 15/24* (2013.01); *G01S 7/4865* (2013.01); *G01S 17/931* (2020.01);
(Continued)

(58) Field of Classification Search
None
See application file for complete search history.

(56) References Cited

U.S. PATENT DOCUMENTS 6,317,237 B1 11/2001 Nakao et al.
9,661,424 B1 * 5/2017 Bakish .................... G10L 15/25
(Continued)

FOREIGN PATENT DOCUMENTS

| | | | |
|---|---|---|---|
| CN | 102027536 | A | 4/2011 |
| CN | 108346430 | A | 7/2018 |
| DE | 10 2016 003 401 | A1 | 10/2017 |

OTHER PUBLICATIONS

S.J. Rothberg et al., "Laser Vibrometry: Pseudo-Vibrations", Journal of Sound and Vibration, Elsevier, Amsterdam, vol. 135, No. 3, pp. 516-522, Dec. 22, 1989.

(Continued)

*Primary Examiner* — Marcus E Windrich
(74) *Attorney, Agent, or Firm* — STAAS & HALSEY LLP

(57) ABSTRACT

A detection device provides a voice signal of a person and includes a light source, a first planar carrier medium, a second planar carrier medium, a sensor device, and an evaluation device. The first planar carrier medium includes an input coupling region and an output coupling region. The second planar carrier medium includes a light input coupling region and a light output coupling region. Light from the light source is emitted into the second planar carrier medium and output in the direction of a front neck region of the person, and the light reflected on the neck region is input into the first planar carrier medium and output out of the first planar carrier medium. The output light is detected by the sensor device which provides sensor data to the evaluation
(Continued)

17 12' 100 12 40 100' 36 10 30 44 19 16 42 100 100' 18 11 37 31 37 13 31' 32 34 device which converts the sensor data into vibrational data and provides the voice signal.

8 Claims, 3 Drawing Sheets

(51) Int. Cl.

*G01S 17/931* (2020.01)
*G02B 6/42* (2006.01)
*G06F 18/22* (2023.01)
*G10L 15/22* (2006.01)
*G10L 25/51* (2013.01)

(52) U.S. Cl.

CPC ........... *G02B 6/4206* (2013.01); *G06F 18/22* (2023.01); *G10L 15/22* (2013.01); *G10L 25/51* (2013.01)

(56) References Cited

U.S. PATENT DOCUMENTS 9,877,114 B2* 1/2018 Sebastian .............. G01S 7/4815
2014/0119737 A1* 5/2014 Bakish ................... A41D 13/11 398/133
2015/0006165 A1* 1/2015 Schmidt .................. G10L 25/54 704/231
2016/0267911 A1* 9/2016 Koetje ..................... H04R 3/04
2017/0150254 A1 5/2017 Bakish et al.
2019/0041634 A1 2/2019 Popovich et al.
2023/0215437 A1* 7/2023 Maizels .................. G10L 13/02 704/235

OTHER PUBLICATIONS

European Office Action issued in European Application No. 20 723 386.7 dated Sep. 5, 2023.

English Translation of the International Preliminary Report on Patentability for International Application No. PCT/EP2020/062114 dated Nov. 4, 2021 (8 pages).

Yekutiel Avargel et al.: "Robust speech recognition using an auxiliary laser-doppler vibrometer sensor", 2011 Speech processing conference (6 pages).

Peng Renhua et al.: "Bandwidth extension for speech acquired by laser Doppler vibrometer with an auxiliary microphone", 2015 IEEE 10th international conference on information, communications and signal processing (4 pages).

Weihong Li et al.: "LDV Remote Voice Acquisition and Enhancement", 18th International Conference on Pattern Recognition, IEEE Computer Society, 2006, 4 pages.

German Office Action from German Patent Application No. 10 2019 206 371.3 dated Apr. 19, 2021 (8 pages).

International Search Report in Application No. PCT/EP2020/062114 dated Aug. 11, 2020 (17 pages including translation).

PCT/EP2020/062114, Apr. 30, 2020, Marcus Klug, Audi AG.

10 2019 206 371.3, May 3, 2019, Marcus Klug, Audi AG.

Chinese Office Action issued in counterpart Chinese Application No. 202080033226.5 dated Jan. 29, 2024.

* cited by examiner

DETECTION DEVICE FOR A VOICE SIGNAL OF A PERSON, AND METHOD FOR DETECTING A VOICE SIGNAL OF A PERSON USING SUCH A DETECTION DEVICE

CROSS REFERENCE TO RELATED APPLICATIONS

This application is a U.S. national stage of International Application No. PCT/EP2020/062114, filed on Apr. 30, 2020. The International Application claims the priority benefit of German Application No. 10 2019 206 371.3 filed on May 3, 2019. Both International Application No. PCT/EP2020/062114 and German Application No. 10 2019 206 371.3 are incorporated by reference herein in their entirety.

BACKGROUND

Described herein is a capture apparatus for a speech signal of a person. Also described herein is a motor vehicle having such a capture apparatus, and a method for capturing a speech signal of a person using such a capture apparatus.

In the human body, the voice box, the so-called larynx, which as part of the respiratory tract includes the transition from the throat to the windpipe in the anterior neck region, is decisive for generating a human voice. This is because the laryngeal muscles are used to make the vocal cords, which are arranged in the laryngeal region, vibrate for the purposes of generating the voice. Various technical processes which can be used to capture and evaluate these micro-movements in the anterior neck region, which always occur when a person speaks, are already known. These processes each require a sensor that must be arranged with a direct line of sight to the anterior neck region of the person so that the micro-movements in the anterior neck region which contain information about a speech signal can be captured. Thus, an optical component is required and must for example be positioned in the visual field of the person.

U.S. Patent Application Publication No. 2016/0267911 A1 describes a vehicle speech capture system, which includes an optical sensor and a microphone. In this case, the optical sensor is arranged in a rearview mirror of the vehicle and designed to capture optically derived acoustic signals of a person in the motor vehicle. In this case, the optical sensor is formed as an interferometer.

U.S. Patent Application Publication No. 2014/0119737 A1 describes a system for capturing speech-related acoustic signals by using a laser-based capture device which is formed as a mask. This mask is worn over a part of the face of a speaker and in this case conceals the mouth of the user. A laser microphone of the system is constructed to capture vibrations of the mask and output the vibrations in the form of speech signals.

U.S. Pat. No. 6,317,237 B1 describes an apparatus which emits an infrared laser beam in the direction of a glass pane of a building, at which the light beam is reflected, with the reflected light beam being received by a reception apparatus. This is intended to capture vibrations of the glass pane generated by voices in the room. Therefore, this apparatus should likewise be used to capture and evaluate a speech signal within a room.

Optical diffraction gratings that are produced holographically and are therefore referred to as holographic gratings are known. In this regard, it is known from the scientific publication "Volume-phase holographic gratings and their potential for astronomical applications" (S. C. Barden, J. A. Arns and W. S. Colburn, Proceedings SPIE 3355, Optical Astronomical Instrumentation, 1998) that light that is incident on such a holographic grating at an angle that is clearly outside the angular range that meets the Bragg condition passes through the holographic grating without diffraction. However, if light is incident on the holographic grating at an angle such that the Bragg condition is at least approximately satisfied, the light is diffracted at an angle. A similar behavior can be seen with regard to a wavelength dependency of the influence of the holographic grating on light. This is because light having a wavelength that is clearly outside the wavelength range specified by the Bragg condition as the so-called Bragg wavelength likewise passes through the holographic grating without being diffracted, and only light having a wavelength that at least approximately satisfies the Bragg condition is diffracted at the holographic grating. Using complex holographic grating structures, it is thus possible, for example, for light having two different wavelength ranges to be diffracted at the same angle in each case. In addition, a holographic grating can be used, for example, to split light having different wavelengths into different light paths, with the result that a dispersive beam splitter can be implemented with the aid of a holographic grating.

SUMMARY

Described herein is a solution by which it is possible to provide a capture apparatus that is as inconspicuous as possible for a speech signal of a person.

This may be achieved by the capture apparatus described herein, the motor vehicle having the capture apparatus, and the method of operating the capture apparatus. Advantageous developments are also disclosed in the following description, drawings and the claims.

The capture device for a speech signal of a person as described herein includes a light source, a sensor device, an evaluation device and a first planar carrier medium. In turn, the evaluation device has a conversion unit and an interpretation unit. By way of example, the first light source is an emitter of a laser beam in the infrared wavelength range. In turn, the sensor device is constructed to capture reflected light from the light source and provide the light in the form of sensor data. By way of example, the sensor device is a sensor that is constructed to capture infrared light signals, i.e., an infrared sensor.

The first planar carrier medium is formed as a light guide, on which an input coupling region and an output coupling region are provided. By way of example, the carrier medium is realized as a transparent film made of plastic, wherein the carrier medium additionally transmits light from a surroundings to the sensor device. That is to say, the carrier medium can transmit light, which is input coupled into the carrier medium, to the sensor device by internal reflection, for example total internal reflection. The sensor device itself can capture the transmitted light once it has been output coupled from the carrier medium, and can use the light to generate sensor data. The light required to this end is captured or collected by using the first planar carrier medium at a surface of the first planar carrier medium with the input coupling region and the output coupling region. In this case, the carrier medium is formed as a light-guiding carrier medium.

The light source of the capture apparatus is constructed to emit pulsed light, the pulsed light for example being pulsed infrared light. To this end, the light source can be arranged, for example, to the side of the planar carrier medium or, for example, next to the first planar carrier medium. The input coupling region is formed as a holographic element with a first deflection structure. A description of a mode of operation of such a holographic element, which is often referred to as an optical grating and which can be produced by using holographic processes, can be found in the scientific publication cited above, for example. The input coupling region can be accordingly realized as a diffraction grating, for example. The first deflection structure of the input coupling region is constructed to input couple light, which is emitted by the light source and reflected at the person, into the first planar carrier medium. Consequently, in this example, the reflected pulsed infrared light, which was reflected at the person, is input coupled into the capture apparatus itself, i.e., into the first planar carrier medium, by using the input coupling region. In this case, the light source is arranged in such a way in a preferred installation position that the pulsed light is emitted in the direction of an anterior neck region of the person and reflected there. Thus, the first deflection structure is embodied to input couple the light, which is reflected at the person, into the carrier medium and in the process significantly deflect the light such that the input coupled light satisfies a critical angle condition.

The first planar carrier medium is constructed to transmit the input coupled reflected light by internal reflection from the input coupling region to the output coupling region. Within the carrier medium, the reflected light can be guided in zigzag-like movements along a direction parallel to the plane of the surface of the first planar carrier medium. Finally, the output coupling region, which is likewise constructed as a holographic element, has a second deflection structure that is designed to output couple the transmitted reflected light, which is incident on the second deflection structure, from the first planar carrier medium. By way of example, the second deflection structure of the output coupling region can likewise be realized as a diffraction grating.

Expressed differently, the pulsed light of the light source that was reflected at the person is deflected or diffracted at the first deflection structure of the input coupling region, input coupled into the carrier medium, transmitted by the carrier medium, deflected or diffracted at the second deflection structure and output coupled from the carrier medium again at the location. In this case, the input coupling region for example extends over an entire surface of the planar carrier medium such that the reflected light can be captured or picked up over a relatively large area, depending on the dimensions of the planar carrier medium. Alternatively, the input coupling region can extend over a portion of the surface of the first planar carrier medium.

From the input coupling region, the input coupled reflected light can be transported through the first planar carrier medium to any chosen output coupling region. To capture the light that has been output coupled from the carrier medium, the sensor device is adjacent to the output coupling region. The sensor device itself is constructed to capture the light output coupled in the output coupling region and provide the light in the form of sensor data. These sensor data describe a time of flight of the pulsed light that was emitted by the light source and reflected at the person, i.e., of the light captured by the sensor device. It follows that the sensor device is constructed as a lidar (abbreviation for light detection and ranging) device as it is constructed to carry out a time-of-flight measurement using pulsed light. The lidar device is a process related to a radar for optical distance and speed measurement. In this case, the light scattered back following the emission of a light pulse is detected and a distance to the location where the light pulses are scattered can be calculated from a time of flight of the corresponding light signals.

The evaluation device of the capture apparatus is configured to convert the sensor data into vibration data by using the conversion unit. This is because the distance to the person can be calculated from the time-of-flight differences of the respective pulsed light signal, which are provided by the sensor device, and consequently it is ultimately possible to detect the micro-vibrations in the anterior neck region of the person. A precondition for this is that the capture device is positioned in the preferred installation position such that the light from the light source is reflected in the anterior neck region of the person.

The speech signal of the person is provided by using the interpretation unit of the evaluation device by evaluating the vibration data by applying a speech interpretation criterion. Thus, the vibration data are used to determine the speech spoken by the person in the form of the speech signal. In this case, the speech interpretation criterion contains for example respective vibration data, which are correlated to respective speech signal components which ultimately make up the speech signal of the person, and so the interpretation unit is designed to evaluate the vibration data by using the speech interpretation criterion, in such a way that the speech signal of the person is providable. What is at least exploited in this case is that the reflected light is transmitted to the sensor device by using the first carrier medium, which has the input coupling region and the output coupling region and a planar form. Thus, for example, the first planar carrier medium can be arranged in a motor vehicle, for example in the region of the windshield of the motor vehicle if the carrier medium has a transparent form. By way of example, if the pulsed laser light is now emitted in the direction of the driver of the motor vehicle by using a light source positioned in the region of the upper instrument panel, the reflected light, which is for example reflected at the anterior neck region of the person, can be recorded, input coupled and transmitted to a sensor device, for example positioned at an edge region of the windshield, using the planar carrier medium. As a result, the capture device can be integrated particularly inconspicuously into the motor vehicle since the large area of the windshield where the transparent first planar carrier medium is arranged is unobtrusively used as the capture region for the reflected light.

Such a capture apparatus which provides the speech signal of the person can be used for example to complement a speech recognition system of the motor vehicle, wherein the speech recognition system is for example designed to control a predetermined driver assistance function of the motor vehicle by using recognized and interpreted acoustic commands from the driver. An advantage arising as a result is that the influence of noise, for example the noise of the motor of the motor vehicle or speech signals from other persons in the motor vehicle, is reduced since ultimately the laryngeal movement, and hence the region of the speaker, i.e. the driver, that is relevant to the generation of the speech signal is captured and evaluated directly.

The evaluation device with the subunits of conversion unit and interpretation unit has for example a processor device which is designed to provide the speech signal of the person. To this end, the processor device can have at least one microprocessor or at least one microcontroller. Furthermore, the processor device can have program code which is configured upon execution by the processor device to provide the speech signal of the person. The program code can be stored in a data memory of the processor device.

Also described herein are embodiments resulting in additional advantages.

In an advantageous embodiment described herein, provision is made for the vibration data provided to be compared to reference vibration patterns stored in the interpretation unit during the evaluation of the vibration data by applying the speech interpretation criterion, the respective stored reference vibration patterns being assigned to respective speech signals. Thus, the speech interpretation criterion contains respective vibration data, the so-called reference vibration patterns, which are correlated to respective speech signal components which ultimately make up the speech signal of the person, and so the interpretation unit is designed to evaluate the vibration data by using the speech interpretation criterion, in such a way that the speech signal of the person is providable. Thus, the speech interpretation criterion provides a type of speech signal database, on the basis of which corresponding speech signals can be quickly and reliably associated with the vibration data.

An embodiment provides for the input coupling region and the output coupling region to have at least one optical grating, for example a surface holographic grating or a volume holographic grating, as a deflection structure. In this context, the capture apparatus can also be referred to as a HoloCam, short for holographic camera.

As already mentioned, an optical grating, also referred to as a diffraction grating, and its mode of action and production method are generally known, as is evident, for example, from the scientific publication cited above. In principle, an optical grating can be based on at least partially periodic structures, what is known as a grating structure, in a substrate. By using such a grating structure, an optical grating can bring about, through the physical effect of diffraction, light guidance, as is known, for example, from mirrors, lenses or prisms. If light is, that is to say if light rays are, incident on the optical grating, wherein the incident light rays for example satisfy the Bragg equation, the light rays are diffracted or deflected by the optical grating. The light can thus be guided for example by interference phenomena of the light rays diffracted by the optical grating. The deflection structure of the input coupling region or the output coupling region can accordingly also be referred to as a diffraction structure.

For example, an optical grating can be constructed to be direction-selective or angle-selective with respect to the incident light. Thus, only light, for example a portion of the light, that is incident on an optical grating from a predetermined direction of incidence, for example at a predetermined angle, can be deflected. Light, for example a portion of the light, that is incident on the optical grating from a different direction is for example not deflected, or is less deflected, the greater the difference to the predetermined direction of incidence is. The light portion that deviates from the predetermined direction of incidence or optimum direction of incidence can consequently propagate for example unhindered through the substrate with the optical grating.

Additionally or alternatively, an optical grating can also be constructed to be wavelength selective or frequency selective. Thus, only light, for example a first portion of the light, having a predetermined wavelength can be deflected or diffracted by the optical grating at a specific angle of diffraction. Light, for example a second portion of the light, having a wavelength other than the predetermined wavelength is for example not deflected, or is less deflected, the greater the difference to the predetermined wavelength is. The second light portion that deviates from the predetermined wavelength or optimum wavelength can consequently propagate for example unhindered through the substrate with the optical grating. In this way, for example, at least one monochromatic light portion can be split off from polychromatic light that is incident on the optical grating. The deflection effect for the optimum wavelength is advantageously at a maximum and decreases toward longer and shorter wavelengths, for example in the manner of a Gaussian bell, or becomes weaker. For example, the deflection effect only acts on a fraction of the visible light spectrum and/or in an angular range of less than 90 degrees.

An optical grating can be produced, for example, by using light exposure of a substrate, that is to say for example photolithographically or holographically. In this context, the optical grating can then also be referred to as a holographic or holographic-optical grating. Two types of holographic-optical gratings are known: surface holographic gratings (in short: SHG) and volume holographic gratings (in short: VHG). In the case of a surface holographic grating, the grating structure can be generated by optically deforming a surface structure of the substrate. Due to the modified surface structure, incident light can be deflected, for example reflected. Examples of surface holographic gratings are so-called sawtooth or blazed gratings. In contrast to this, the grating structure in the case of volume holographic gratings can be incorporated into the entire volume or part of the volume of the substrate. Surface holographic gratings and volume holographic gratings are usually frequency selective. However, optical gratings that can diffract polychromatic light are also known. These are called multiplexed volume holographic gratings (in short: MVHG) and can be produced, for example, by changing the periodicity of the grating structure of an optical grating or by arranging a plurality of volume holographic gratings one behind the other.

A polymer, for example a photopolymer, or a film, for example a photosensitive film, for example made of plastic or organic substances, is particularly suitable as the material of the substrate for incorporating an optical grating. Substrates that have a deflection structure for diffracting light, for example in the form of an optical grating, can also be referred to as holographic optical elements (HOE).

Thus, as a result of the described form of the input coupling region and the output coupling region, it becomes possible to diffract the light which is incident on the input coupling region to for example the sensor device arranged laterally on the cover plate, as a result of which it is ultimately possible to provide the speech signal according to the above-described evaluation operations.

An advantageous embodiment described herein provides for a light input coupling region and a light output coupling region to be provided at a second planar carrier medium. Thus, the capture apparatus can also include a second carrier medium in addition to the first carrier medium. In this case, the light input coupling region is formed as a holographic element with a third deflection structure. The third deflection structure is designed to input couple light, which is incident on the third deflection structure from the light source of the capture apparatus, into the second planar carrier medium. By way of example, the third deflection structure of the light input coupling region can be realized as a diffraction grating. In this case, the light input coupling region is positioned such that pulsed light which was emitted by the light source can be introduced into the second planar carrier medium by way of the light input coupling region. The second planar carrier medium is constructed to transmit the input coupled light by internal reflection from the light input coupling region to the light output coupling region. In turn, the light output coupling region is formed as a holographic element with a fourth deflection structure, wherein the fourth deflection structure for example is likewise realized as a diffraction grating. The fourth deflection structure is designed to output couple the transmitted light, which is incident on the fourth deflection structure, from the second carrier medium and emit the light in the direction of the person. Thus, the light from the light source could be transported from the light source to the light output coupling region by way of a planar carrier medium, which is described here as second planar carrier medium, with the light output coupling region emitting the pulsed light in the direction of the person, whereupon the light is reflected at the person and transmitted into the first planar carrier medium via the input coupling region and ultimately transmitted to the sensor device.

The second planar carrier medium can be formed separately from the first planar carrier medium and, for example, likewise be formed as a transparent film. By way of example, it is now possible for the light source to be arranged in a region of a first A pillar of a motor vehicle, whereupon the light from the light source is transmitted via the second planar carrier medium, which is arranged on the windshield of the motor vehicle, to a central point centrally in front of the driver seat of the motor vehicle and the light is emitted by using a light output coupling region positioned there in the direction of the anterior neck region of the driver. In this example, the first carrier medium, which is likewise arranged on the windshield as a transparent film, can be positioned directly next to the second carrier medium such that the input coupling region is positioned close to the light output coupling region or is even at least partly congruent with the latter. Now, the light reflected at the anterior neck region of the person is input coupled into the first carrier medium at the input coupling region, the first carrier medium thereupon transmitting the light to for example a second A pillar of the motor vehicle, in which the sensor device and, for example, the evaluation device as well are positioned. This allows realization of a completely inconspicuous capture apparatus which cannot be seen by the driver of the motor vehicle in the described installation position, especially not if the light from the light source is emitted in an invisible wavelength range, for example as infrared light. Thus, what can be achieved by exploiting the properties of the HOE is that neither light source nor sensor device need be arranged in a visual field of the person whose speech signal is intended to be provided; instead, it is possible to transfer a signal of the light, which was emitted by the light source and reflected by the person, by using the HOE to the respective specified target position, i.e., to the anterior neck region of the person or to the sensor device.

According to an advantageous embodiment described herein, provision is made for the first planar carrier medium and the second planar carrier medium to be formed as a common main carrier medium, on which the input coupling region, the output coupling region, the light input coupling region and the light output coupling region are provided. Thus, provision is made for the capture apparatus to include only one carrier medium, the so-called main carrier medium; i.e., the first planar carrier medium and the second planar carrier medium are formed in spatially contiguous fashion. Thus, what is obtained by the planar embodiment of the common main carrier medium is a large light-exit surface for the light from the light source and a large light-entry surface for the reflected light, as a result of which inaccuracies of measurement can be compensated for up to a certain degree. By way of example, it is thus possible for a wavefront to be emitted in the direction of the person by using the HOE and likewise for the reflected wavefront to be input coupled again and transmitted to the sensor device via the predetermined light-entry surface of the input coupling region of the carrier medium. This facilitates various embodiments of the emitted pulsed light and consequently facilitates different designs of the capture apparatus. Ultimately, this allows reliable provision of the speech signal of the person since a reliable transmission path of the light from the light source to the anterior neck region of the person and of the reflected light from the anterior neck region of the person to the sensor device are facilitated.

In a further embodiment described herein, provision is made for the capture apparatus to include a microphone device. Thus, the capture apparatus can include an acoustic transducer which converts airborne sound as alternating acoustic pressure oscillations into corresponding voltage changes, i.e., corresponding microphone signals. By way of example, such a microphone device may already be provided in a motor vehicle, for example for a speech recognition device for the speech control of vehicle functions. The microphone device is designed to capture speech data from the person and to provide the speech data to the evaluation device. In turn, the evaluation device is designed to provide raw data for the interpretation unit of the evaluation device by applying a weighting criterion to the provided vibration data and speech data. Thus, a comparison is performed between the sensor data captured by the microphone device and the sensor data provided by the sensor device of the capture apparatus, as described above, from which the conversion unit has determined the vibration data. By way of example, depending on the current driving state and/or a frequency range of the speech data, the weighting criterion can detect whether the speech data are data which are correlated to the speaking person of the driver. Optionally, the weighting criterion can moreover prevent background noises from exerting a significant influence on the raw data and consequently from exerting a significant influence on the quality of the provided speech signal. This is because the raw data provided to the interpretation unit are evaluated in such a way that the speech signal of the person is provided by applying the speech interpretation criterion. Thus, the vibration data provided by using the conversion unit are ultimately used to analyze the noises in the motor vehicle in conjunction with the speech data of the microphone, and to extract and prepare the speech contained in the noise.

By way of example, provision can be made for the speech data of the microphone to be optimized with the aid of the vibration data by applying the weighting criterion, to the effect of providing a speech signal that is as pure as possible and has as little background noise as possible. This ultimately optimizes the speech signal provided from the person, and so this speech signal particularly reliably reproduces the actually spoken speech by the person.

A further embodiment described herein moreover provides for the capture apparatus to include an image capture device. By way of example, the image capture device can be formed as an image sensor or camera sensor, for example a CCD (charge-coupled device) sensor or as a CMOS (complementary metal oxide semiconductor) sensor. The image capture device is constructed to capture ambient light which is incident on the input coupling region from the surroundings, which is transmitted by the first planar carrier medium to the output coupling region and which is output coupled at the output coupling region and to provide the ambient light in the form of image data, which correlate with the captured ambient light, to the evaluation device. In the case of such an embodiment of the image capture device as an image sensor, the first planar carrier medium at which the input coupling region and the output coupling region are arranged can additionally take on the task of an objective, i.e., an imaging optical unit. Alternatively, the image capture device can be constructed as a camera or photographic camera, for example as a micro camera, and can consequently be realized with its own imaging optical unit. By way of example, the image data which correlate with the captured surroundings image contain image information in relation to the driver seated in front of the capture apparatus in the case of the above-described preferred installation position in the motor vehicle.

The evaluation device is designed to provide raw data for the interpretation unit by applying a comparison criterion to the provided vibration data and image data. This is because the image data for example contain information relating to the current alignment of the anterior neck region or of the head of the driver relative to a specified normal alignment, in which the driver faces straight ahead through the windshield in the longitudinal vehicle direction. By way of example, if the driver now moves their head forward or backward relative to the windshield or inclines their head relative to the described normal arrangement, this can be detected on the basis of the image data. An effect on the vibration data caused thereby can consequently be corrected with the aid of the comparison criterion such that the raw data include a reliable description of the actual vibration of the anterior neck region of the person and are not influenced, for example, by movements of the driver on a slow timescale relative to these vibrations. Now, the interpretation unit is constructed to provide the speech signal of the person by evaluating the raw data and by applying the speech interpretation criterion. Consequently, the movement of the driver can be considered independently of their movement in the anterior neck region while the driver is speaking, and so the speech signal of the person can always be provided reliably without this signal being able to influence the quality of the speech signal as a result of relative movements of a head and neck region of the driver relative to the capture apparatus.

In an example embodiment described herein, provision is made for the planar carrier medium between the input coupling region and the output coupling region to be formed as a transparent plate, film, or lacquer. The planar carrier medium can thus be constructed with a small thickness, and so the width and length of the planar carrier medium is large in comparison with this small thickness of the carrier medium, which is perpendicular to the planar surface of the planar carrier medium. The planar carrier medium can have a thickness between for example half a millimeter and five millimeters. If the planar carrier medium is formed as a transparent film, it is additionally formed in bendable fashion; i.e., it can be deformed in a non-destructive fashion, wherein a non-destructive deformation is understood to mean non-destructive bending of the film by a bending radius of less than two centimeters. If the planar carrier medium is formed as a transparent lacquer, it can have a thickness in the micrometer range and subsequently of less than one millimeter. As a result, the planar carrier medium with the input coupling region and the output coupling region can be inconspicuously arranged at numerous positions, for example within a motor vehicle or on a wall without there concealing for example an object arranged therebehind, and so for example an arrangement on a window of the motor vehicle is conceivable. In this way, the capture apparatus is able to be integrated into any surroundings.

In a further embodiment described herein, provision is made for the input coupling region and the output coupling region to be formed in one piece with the carrier medium, or for the carrier medium to be formed as a separate element from the input coupling region and the input coupling region. In the first case, the input coupling region and the output coupling region can thus, for example, be incorporated directly on a surface of the carrier medium. This means that the deflection structure can be for example etched or lasered into the surface of the carrier medium. Thus, the carrier medium itself can be formed as a HOE. In the second case, the input coupling region, the output coupling region and the carrier medium can be formed separately. In this case, the input coupling region and the output coupling region can form, for example, at least one first element, and the carrier medium can form a second element that adjoins the first element. The input coupling region and the output coupling region can thus be formed in at least one HOE. By way of example, the input coupling region and the output coupling region can be formed in different sections of a holographic film or plate. To fasten the film or plate to the carrier medium, the film or the plate can be adhesively bonded to the carrier medium. Alternatively, the holographic film can also be formed as an adhesive film and adhere to the surface of the carrier medium directly, that is to say without adhesive, by using molecular forces. The capture device with the carrier medium and the input coupling region and output coupling region arranged thereon can thus be produced in various ways and in a cost-effective manner.

The motor vehicle described herein includes a capture apparatus as described above. In this case, the first planar carrier medium with the input coupling region and the output coupling region may be arranged at one of the following positions in the motor vehicle: in a screen of a display apparatus in the passenger compartment, in a rear-view mirror, in a center console, in an instrument panel, in a combination instrument, in a windshield, in a side window and/or between two A pillars of the motor vehicle. In this case, the first planar carrier medium can be arranged in each case on the surface of the aforementioned component of the motor vehicle, especially if the first planar carrier medium is formed as a transparent carrier medium, for example as a film, a cover plate or lacquer. This allows the capture device to be used for measurements in at least two directions, to be precise inward into the motor vehicle interior, i.e., for example, toward the driver of the motor vehicle, but also outward in the direction of a surroundings of the motor vehicle. By way of example, this allows the speech signal of a person standing outside of the motor vehicle, the vibrations of which in the anterior neck region are captured by using the capture apparatus and provided in the form of the speech signal from the person, to be output, for example by using an output device in the motor vehicle interior, and so for example the driver of the motor vehicle can hear what this person located outside of the motor vehicle currently has to say without having to open a window of the motor vehicle for this purpose. To this end, the first planar carrier medium can be arranged for example on an outer side of the windshield or on at least one of the side windows of the motor vehicle. Ultimately, all that is relevant is that the first planar carrier medium is positioned in such a way within the motor vehicle or on the outer wall of the motor vehicle that this allows the light from the light source to be emitted in such a way that it strikes the person, for example the anterior neck region of the person, and that moreover the reflected light is incident on the input coupling region of the first planar carrier medium such that the capture apparatus is ultimately arranged in the above-described preferred installation position. Ultimately, the capture apparatus is usable at different positions within a motor vehicle and moreover usable for the various aforementioned purposes.

The disclosure also includes embodiments of the motor vehicle described herein which have features that have already been described in conjunction with the developments of the capture apparatus described herein. For this reason, the corresponding developments of the motor vehicle described herein will not be described again here.

The motor vehicle described herein is for example embodied in the form of a motorized vehicle, for example a passenger car or truck, or as a minibus or motorcycle.

In an advantageous embodiment of the motor vehicle described herein, provision is made for the motor vehicle to include at least one capture device, for example a camera device, an acceleration capture device and/or a rotation rate capture device. A rotation rate capture device is sometimes also referred to as a gyroscope. The at least one capture device is constructed to provide capture data captured thereby to the evaluation device of the capture apparatus. Now, the evaluation device of the capture apparatus is designed to evaluate the capture data of the capture device of the motor vehicle for the purposes of generating the speech signal of the person by using the interpretation unit. This is because further parameters can be captured by using the capture device, for example parameters describing the current movement of the motor vehicle.

By way of example, the driver may perform a certain relative movement relative to the reference system of the motor vehicle while the motor vehicle is traveling on account of inertia phenomena, the relative movement ultimately having an influence on the sensor data and hence on the vibration data which form the basis for ascertaining the speech signal. Therefore, the capture device is used to include additional data relating to the movement of the motor vehicle and/or the movement of the occupants, as in the case of the camera device for example, in order to ultimately facilitate a reduction of error sources with the aid of the capture data when generating the speech signals. An advantage thereof is that a reliable speech signal of the person can be evaluated. Information about the movement of the motor vehicle itself, and for example about the inertial forces within the motor vehicle, can be captured by using the acceleration capture device and/or the rotation rate capture device, wherein the rotation rate capture device captures the rotational movement with which the motor vehicle rotates about its own axis, for example.

The method described herein is developed to capture a speech signal of a person using a capture apparatus, wherein the capture apparatus includes a light source, a sensor device, an evaluation device which has a conversion unit and an interpretation unit, and a first planar carrier medium. The first planar carrier medium is formed as a light guide on which an input coupling region, which is formed as a holographic element with a first deflection structure, and an output coupling region, which is formed as a holographic element with a second deflection structure, are provided.

The method described herein includes the following operations: emitting pulsed light, by using the light source, in a direction of an anterior neck region of the person; input coupling light, which is emitted by the light source and reflected at the anterior neck region of the person, by using the first deflection structure; transmitting the input coupled reflected light by internal reflection from the input coupling region to the output coupling region by using the first planar carrier medium; output coupling the transmitted reflected light, which is incident on the second deflection structure, from the first planar carrier medium by using the second deflection structure; capturing the light that was output coupled in the output coupling region and providing sensor data, which describe a time of flight of the pulsed light which was emitted by the light source and reflected at the anterior neck region of the person, by using the sensor device; converting the sensor data into vibration data, which describe a relative movement of the anterior neck region of the person, by using the conversion unit of the evaluation device, and providing the speech signal of the person by using the interpretation unit of the evaluation device by evaluating the vibration data by applying a speech interpretation criterion to the vibration data. The example embodiments presented in the context of the capture apparatus described herein and the advantages thereof apply accordingly, where applicable, to the method described herein. For this reason, the corresponding developments of the method described herein will not be described again here.

The disclosure also includes a control apparatus for the capture apparatus, wherein the control apparatus is designed to carry out the method described herein, which is carried out by using the capture apparatus. This control apparatus has a processor device which is configured to carry out an embodiment of the method described herein. To this end, the processor device can have at least one microprocessor and/or at least one microcontroller. Furthermore, the processor device can have a program code, which is configured to carry out the embodiment of the method described herein upon execution by the processor device. The program code can be stored in a data memory of the processor device.

The disclosure also includes the combinations of the features of the described embodiments as described herein.

BRIEF DESCRIPTION OF THE DRAWINGS

These and other aspects and advantages will become more apparent and more readily appreciated from the following description of the example embodiments, taken in conjunction with the accompanying drawings of which.

DETAILED DESCRIPTION

Figure 1:
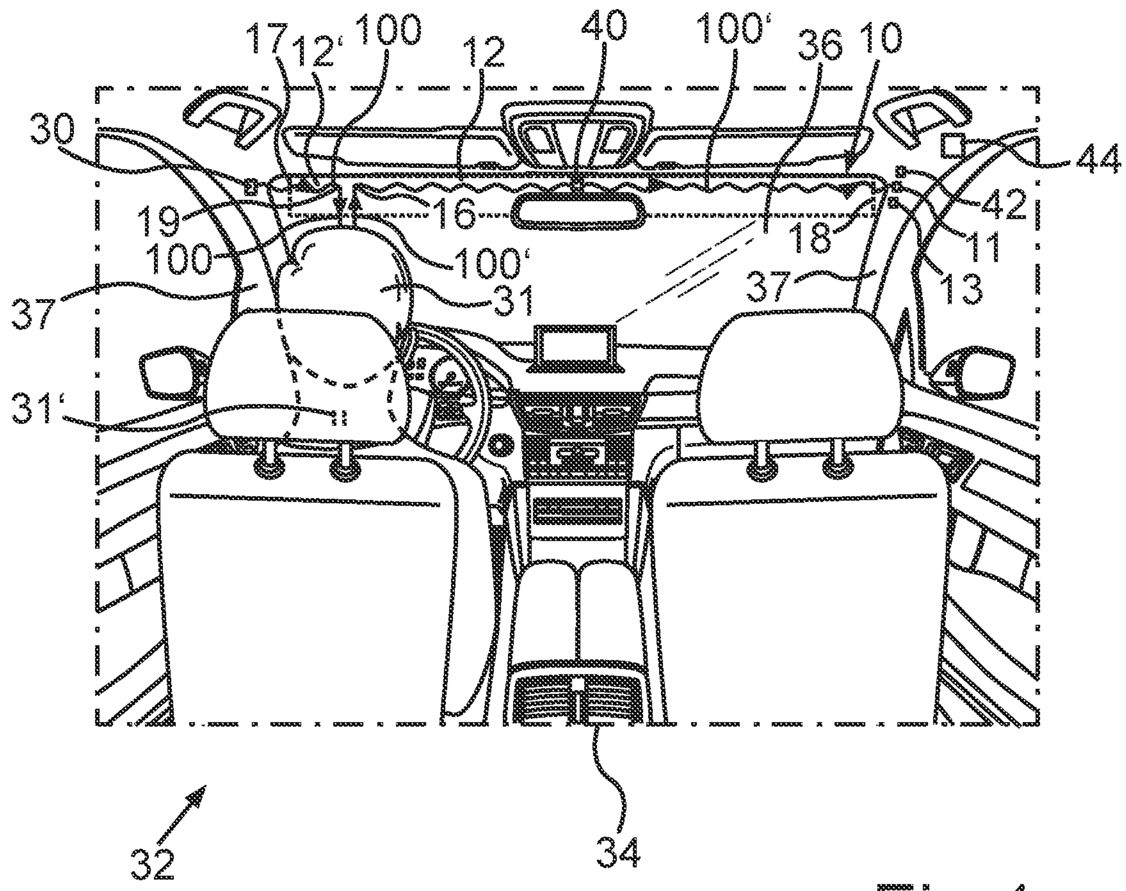
FIG. 1 is a schematic illustration of a motor vehicle having a capture apparatus.

Reference will now be made in detail to example embodiments, the examples of which are illustrated in the accompanying drawings, wherein like reference numerals refer to like elements throughout.

The embodiments discussed below are example embodiments. In the example embodiments, the described components of the embodiments each represent individual features that should be considered independently of one another and also develop the disclosure in each case independently of one another. The disclosure is therefore also intended to include combinations of the features of the embodiments other than those illustrated. Furthermore, the described embodiments may also be supplemented by further features that have already been described.

In the drawings, identical reference signs each denote elements of identical function.

FIG. 1 sketches out a capture apparatus 10 for a speech signal of a person 31. This capture apparatus 10 is arranged in a motor vehicle 32, for example in a passenger compartment 34 of the motor vehicle 32.

The capture apparatus 10 includes a light source 30 which is formed as an infrared light source. The light source 30 is designed to emit pulsed light 100. The capture apparatus 10 additionally includes a sensor device 11 which is formed as a lidar sensor. Moreover, the capture apparatus 10 includes an evaluation device 13. Additionally, the capture apparatus 10 includes a first planar carrier medium 12 which is formed as a light guide. Moreover, the capture apparatus 10 includes a second planar carrier medium 12', which is positioned to the side of the first planar carrier medium 12 in an upper region of a windshield 36 of the motor vehicle 32. Thus, the two planar carrier media 12, 12' are arranged between two A pillars 37 of the motor vehicle 32.

Each of the first planar carrier medium 12 and the second planar carrier medium 12' can be embodied as a transparent plate, film or lacquer. In this example, they are both formed as a transparent film, which is arranged on an inner side of the windshield 36 in each case. It is evident from FIG. 1 that pulsed light 100 emitted by the light source 30 is input coupled into the second planar carrier medium 12' in a light input coupling region 17 and is emitted in the direction of the person 31 in a light output coupling region 19 of the second planar carrier medium 12' such that the light strikes an anterior neck region 31' of the person 31. There, this pulsed light 100 is reflected such that the reflected light 100' is sent back in the direction of the windshield 36. There, the reflected light 100' is input coupled into the first planar carrier medium 12 in an input coupling region 16 and is transmitted to an output coupling region 18 adjacent to the sensor device 11. Thus, the input coupling region 16 and the output coupling region 18 are provided on the first planar carrier medium 12, whereas the light input coupling region 17 and the light output coupling region 19 are provided on the second planar carrier medium 12'.

Moreover, the capture apparatus 10 includes an evaluation device 13, a microphone device 40, an image capture device 42 and a capture device 44, with the capture device 44 in this example being an acceleration capture device which captures an acceleration of the motor vehicle 32. Alternatively, the capture device 44 might be a camera device and/or a rotation rate capture device. Thus, the capture device 44 is constructed to capture a movement of the motor vehicle 32 and/or of the person 31 in the motor vehicle 32 and to provide this in the form of appropriate capture data.

Figure 2:
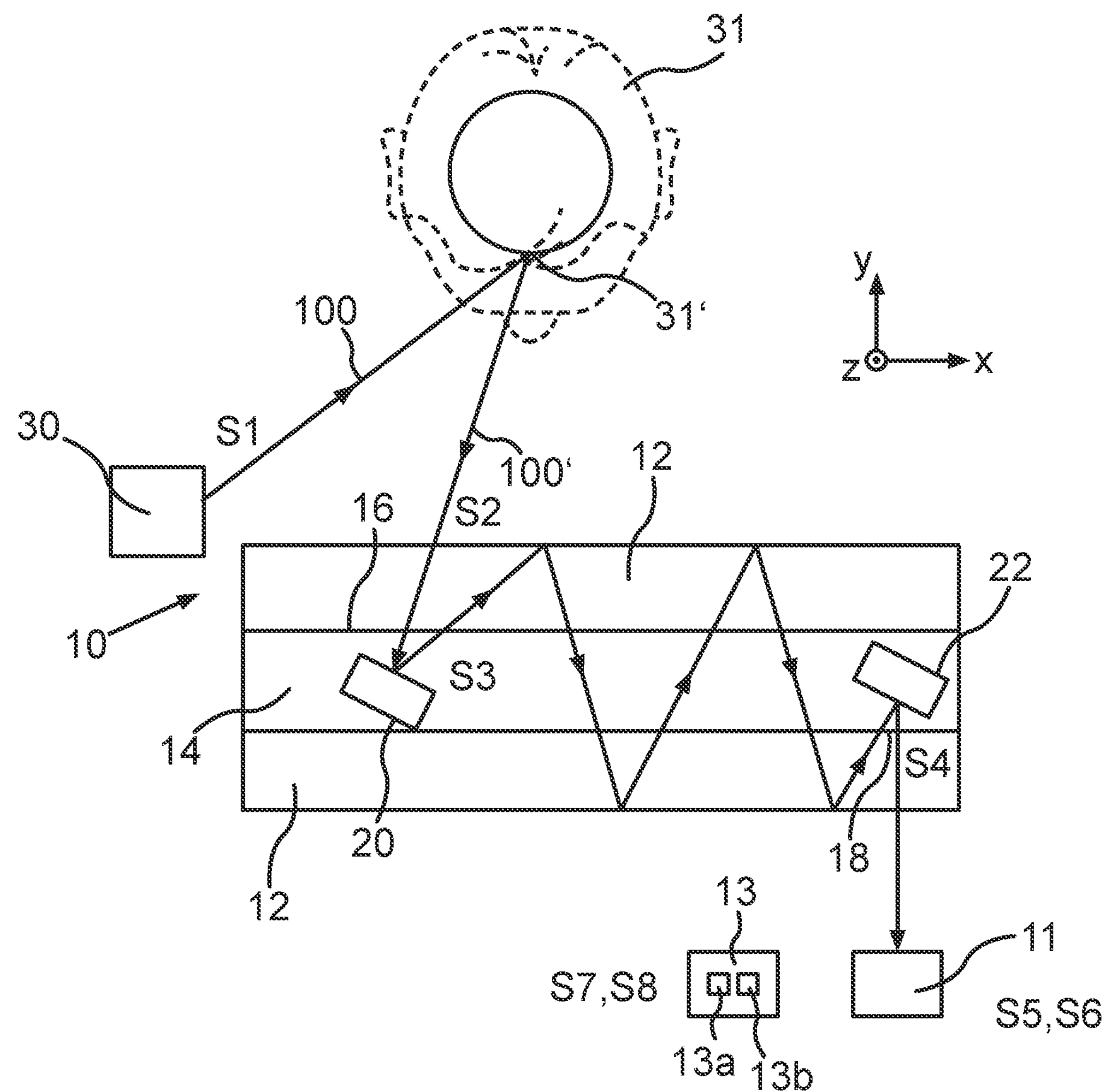
FIG. 2 is a schematic illustration of a capture apparatus having a first planar carrier medium.

FIG. 2 sketches out in detail how the speech signal of the person 31 can be provided with the aid of the capture apparatus 10. It is evident here that the input coupling region 16 is formed as a holographic element 14 with a first deflection structure 20. The first deflection structure 20 is designed to input couple the light 100', which was emitted by the light source 30 and reflected at the person 31, for example at the anterior neck region 31' of the person 31, into the first planar carrier medium 12. The first planar carrier medium 12 now is constructed to transmit the input coupled reflected light 100' by internal reflection from the input coupling region 16 to the output coupling region 18. The input coupling region 16 is likewise formed as a holographic element 14, albeit with a second deflection structure 22. The second deflection structure 22 is designed to output couple the transmitted reflected light 100', which is incident on the second deflection structure 22, from the first planar carrier medium 12. The input coupling region 16 and the output coupling region 18 have at least one optical grating, for example a volume holographic grating or a surface holographic grating, as respective deflection structures 20, 22.

The sensor device 11 is constructed to capture light 100' that was output coupled in the output coupling region 18 and provide the light in the form of sensor data. The sensor data describe a time of flight of the pulsed light 100' that was emitted by a light source 30 and reflected at the person 31, which light was captured by the sensor device 11. Thus, the sensor device 11 is a type of lidar device which can capture and provide the time of flight of the light 100'. The evaluation device 13 includes a conversion unit **13*a* and an interpretation unit 13*b*. The evaluation device 13 is constructed to convert the sensor data into vibration data by using the conversion unit 13*a* and provide the speech signal of the person 31 by using the interpretation unit 13*b* by evaluating the vibration data by applying a speech interpretation criterion. The vibration data provided are compared to reference vibration patterns stored in the interpretation unit 13*b*** during the evaluation of the vibration data by applying the speech interpretation criterion, the respective stored reference vibration patterns being assigned to respective speech signals.

Consequently, the following operations are implemented to capture the speech signal of the person 31: Pulsed light 100 is emitted by using the light source 30 in a operation S1. The light 100' that was emitted by the light source 30 and reflected at the person 31 is input coupled into the first planar carrier medium 12 by using the first deflection structure 20 in an operation S2. Thereupon, the transmission of the input coupled reflected light 100' by internal reflection from the input coupling region 16 to the output coupling region 18 by using the first planar carrier medium 12 is implemented in an operation S3. Thereupon, the transmitted reflected light 100', which is incident on the second deflection structure 22, is output coupled from the first planar carrier medium 12 by using the second deflection structure 22 in an operation S4. Subsequently, the light 100 that was output coupled in the output coupling region 18 is captured by the sensor device 11 in an operation S5, whereupon sensor data are provided in an operation S6 by using the sensor device 11, the sensor data describing the time of flight of the pulsed light 100' which was emitted by the light source 13 and reflected by the person 31. The sensor data are converted into vibration data in a next operation S7, to be precise by using the conversion unit **13*a* of the evaluation device 13. Finally, in an operation S8, the speech signal of the person 31 is provided by using the interpretation unit 13*b*, to be precise by evaluating the vibration data by applying the speech interpretation criterion to the vibration data. What is considered here is that the light source 30 emits the light 100 in such a way that the latter is emitted in the direction of the anterior neck region 31' of the person 31 and reflected there. Thus, the reflected light 100' contains information about vibrations in a laryngeal region of the person 31, as are to be expected in the case of a speaking person 31** and as can consequently be measured and evaluated.

Figure 3:
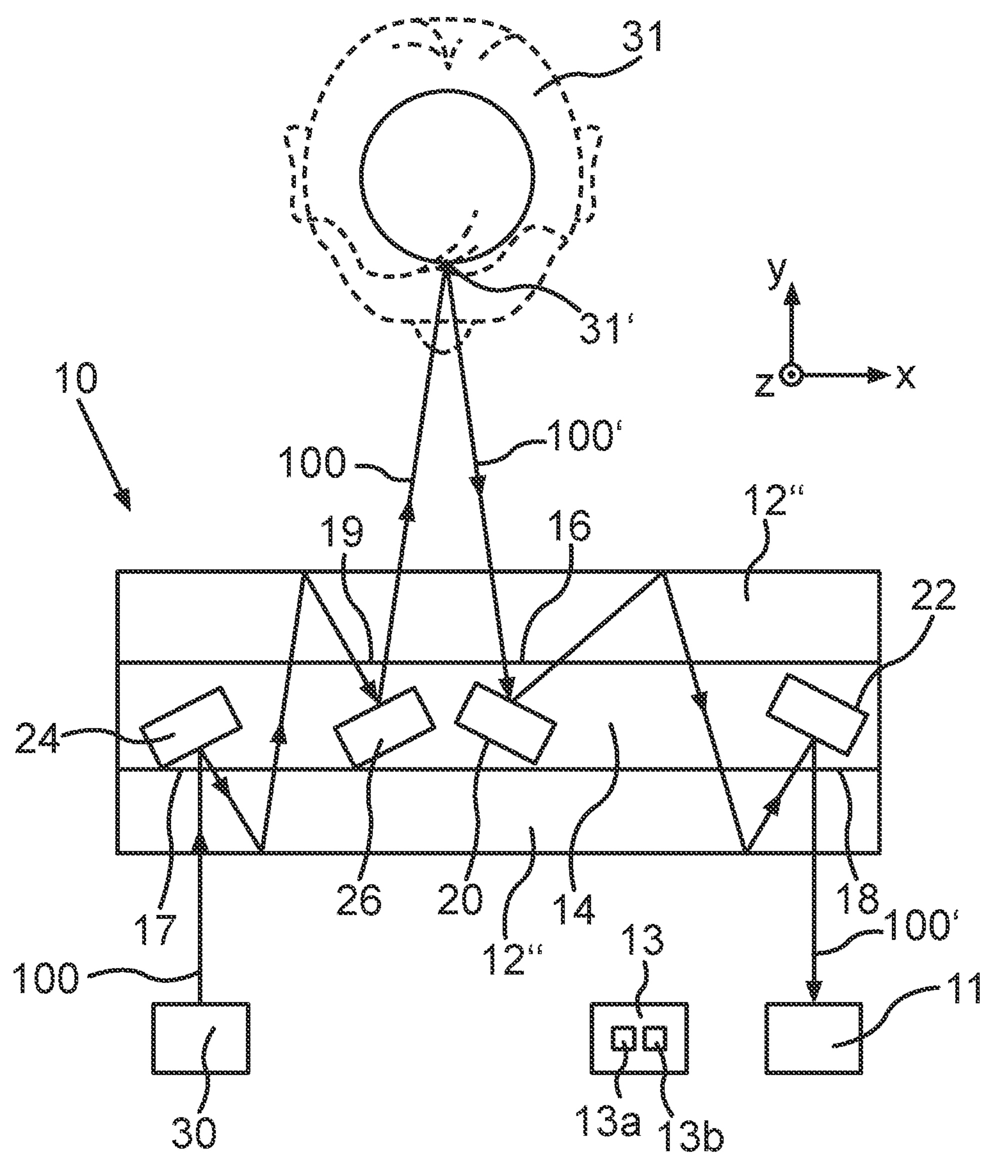
FIG. 3 is a schematic illustration of a capture apparatus having a common main carrier medium.

In FIG. 3, a common main carrier medium 12" is sketched out instead of the first planar carrier medium 12, the common main carrier medium including both the first planar carrier medium 12 and the second planar carrier medium 12'. Therefore, the input coupling region 16 and the output coupling region 18 as well as the light input coupling region 17 and the light output coupling region 19 are provided on the common main carrier medium 12'. In FIG. 1, the first planar carrier medium 12 and the second planar carrier medium 12' were illustrated separately from one another such that the input coupling region 16 and the output coupling region 18 are provided on the first planar carrier medium 12 and the light input coupling region 17 and the light output coupling region 19 are provided on the second planar carrier medium 12'.

The light input coupling region 17 is formed as a holographic element 14 with a third deflection structure 24, as sketched out in FIG. 3. The third deflection structure 24 is constructed to input couple light 100, which is incident on the third deflection structure 24 from the light source 30 of the capture apparatus 10, into the main carrier medium 12". If the capture apparatus 10 includes a separate second planar carrier medium 12' as an alternative to the main carrier medium 12", the light 100 of the light source 30 is input coupled into the second planar carrier medium 12' by the third deflection structure 24. The main carrier medium 12" is now constructed to transmit the input coupled light 100 by internal reflection from the light input coupling region 17 to the light output coupling region 19. The light output coupling region 19 is likewise formed as a holographic optical element 14 with a fourth deflection structure 26. The fourth deflection structure 26 is designed to output couple the transmitted light, which is incident on the fourth deflection structure 26, from the main carrier medium 12" (or from the second carrier medium 12') and to emit the light in the direction of the person 31, for example the anterior neck region 31' of the person 31. Then, the path of the reflected light 100' is analogous to what was described in FIG. 2.

The microphone device 40 of the capture apparatus 10, which is sketched out in FIG. 1, is designed to capture speech data of the person 31 and provide these to the evaluation device 13. The evaluation device 13 is now designed to provide a raw data for the interpretation unit **13*b* by applying a weighting criterion to the provided vibration data and speech data, and to provide the speech signal of the person 31** by the evaluation of the data or the application of the speech interpretation criterion.

The image capture device 42 of the capture apparatus 10, which is likewise sketched out in the drawings, is constructed to capture ambient light which is incident on the input coupling region 16 from the surroundings, which is transmitted through the first planar carrier medium 12 to the output coupling region 18 and which is output coupled at the output coupling region 18 and to provide the ambient light in the form of image data, which correlate with the captured ambient light, to the evaluation device 13. The evaluation device 13 is designed to provide raw data for the interpretation unit **13*b* by applying a comparison criterion to the provided vibration data and image data, and to provide the speech signal of the person 31** by the evaluation of the data by applying the speech interpretation criterion.

The capture device 44 likewise sketched out in FIG. 1, i.e., the acceleration capture device in this example, is constructed to provide capture data captured thereby to the evaluation device 13. The evaluation device 13 is designed to evaluate the capture data for the purposes of generating the speech signal of the person 31 by using the interpretation unit **13*b*. In this case, an acceleration of the motor vehicle 32, for example, on account of which the person 31 carries out a specified relative movement in relation to the motor vehicle 32 even in the anterior neck region 31', which relative movement may influence the sensor data provided by the sensor device 11, can be taken into account. By taking into account these acceleration data of the motor vehicle 32, it is consequently possible to correct possible errors in the ascertained vibration data so that the quality of the speech signal of the person 31 is always optimal, even when the motor vehicle 32** is in motion.

The light source 30, the evaluation device 13, the sensor device 11 and the image capture device 42 are each positioned in one of the two A pillars 37 of the motor vehicle 32 in the motor vehicle 32 sketched out in FIG. 1.

As an alternative to the described position of the first planar carrier medium 12 and of the second planar carrier medium 12' in the windshield 36 of the motor vehicle 32, the first planar carrier medium 12 and/or the second planar carrier medium 12' and/or the common main carrier medium 12" can be positioned in a screen of a display apparatus in the passenger compartment 34 of the motor vehicle 32, in a rearview mirror, in a center console, in an instrument panel, in a combination instrument and/or in a side window.

Overall, the examples show how the capture apparatus can be used to provide laser interferometry, for example for a passenger compartment telephone call. Thus, this provides a contactless larynx microscope for a motor vehicle 32. Ultimately, this allows an optical distance measuring device to be integrated into a windowpane of the motor vehicle 32 or any other position in the motor vehicle 32 with the aid of the first planar carrier medium 12 with the input coupling region 16 and the output coupling region 18, i.e., a holographic optical element HOE. The described example integration into a windowpane of the motor vehicle 32, for example into the windshield 36, can reduce the risk of the capture region being covered, for example by a hand of the driver. Additionally, this can reduce the distance to the object to be measured, the anterior neck region 31' of the person 31, for example by positioning at least the first planar carrier medium 12 in a side window of the motor vehicle 32. Moreover, the capture apparatus 10 can be used in two directions, to be precise inward to the passenger compartment 34 and outward in the direction of the surroundings of a motor vehicle 32. By way of example, this can transmit the speech signal of a person 31 standing outside of the motor vehicle 32 into the passenger compartment 34 without the corresponding window having to be opened.

The technical implementation is carried out by using an emitter, i.e., by using the light source 30, which emits pulsed light 100, i.e., for example, a laser beam as measurement beam. The emitted light 100 is input coupled into a light guide which is produced from a transparent carrier material, the first planar carrier medium 12. The first planar carrier medium 12 can be positioned for example on a windowpane of the motor vehicle 32, but also for example on a screen of a mobile terminal or on any other device. Thus, the emitted light 100 is input coupled by way of a holographic function, i.e., by way of the second planar carrier medium 12' or the common main carrier medium 12", and guided to a respective destination in order there to be output coupled in the direction of the person 31 by way of the light output coupling region 19. The respective input and output coupling of the light 100 can be implemented on the respective carrier medium 12, 12' or at its edge. However, it can be output coupled in the center of the visual field of the person 31 in their direction, where the installation of the light source 30 and of the sensor device 11 would not be possible on account of their physical presence, the latter for example not being positionable centrally on the windshield 36 as the latter needs to be transparent so that the person 31 can see through the windshield 36. The receiving region, i.e., the input coupling region 16, for example has a planar embodiment as a result of which a sensor area of the sensor device 11 is ultimately increased. This can compensate inaccuracies during the measurement up to a certain degree. The light 100' reflected by the anterior neck region 31' of the person 31 can be received by way of the same main carrier medium 12" or else by way of the first planar carrier medium 12 by way of the input coupling region 16 and can be transmitted to the sensor device 11. Consequently, like the light source 30, the sensor arrangement 11 can be arranged offset from the actual location at which the light 100 is emitted in the direction of the person 31 and at which the reflected light 100' is input coupled into the HOE.

By using the sensor data captured by the sensor device 11, it is now possible to calculate the distance to the person 31 and consequently determine the vibrations of the anterior neck region 31'. The vibration patterns obtained thus are subsequently used in order to analyze for example the noises captured by the microphone device 40, and to extract and prepare the speech contained therein. Thus, on the basis of the vibration data, the speech signal of the person 31 is prepared and provided by using the interpretation unit **13*b*** by the evaluation of the vibration data by applying a specified speech interpretation criterion.

Since the motor vehicle 32 is a moving system and inertial effects can lead to the driver, i.e., the person 31, behaving differently to a rigid body of the motor vehicle 32 surrounding them, additional information in relation to the movement of the motor vehicle 32, i.e., in relation to the movement of the person 31 within the motor vehicle 32, can additionally be considered. This information is ascertained by using the capture device 44, i.e., by using the camera device, the acceleration capture device and/or the rotation rate capture device. On the basis of these capture data from the capture device 44, the determination of the speech signal of the person 31 can be improved and, moreover, error sources for corrupt speech signals of the person 31 can be reduced.

A description has been provided with reference to various examples, but it will be understood that variations and modifications can be effected within the spirit and scope of the claims which may include the phrase "at least one of A, B, and C" as an alternative expression that means one or more of A, B, and C may be used, contrary to the holding in Superguide v. DIRECTV, 358 F3d 870, 69 USPQ2d 1865 (Fed. Cir. 2004). That is the scope of the expression "at least one of A, B, and C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C. In addition, the term "and/or" includes a plurality of combinations of relevant items or any one item among a plurality of relevant items. That is, the scope of the expression or phrase "A and/or B" includes all of the following: (1) the item "A", (2) the item "B", and (3) the combination of items "A and B".

The invention claimed is:

1. A motor vehicle, comprising:

a passenger compartment; and a capture apparatus configured to provide a speech signal of a person, the capture apparatus including:

a light source configured to emit pulsed light, a first planar carrier medium configured as a light guide on which an input coupling region and an output coupling region are directly disposed, wherein the input coupling region is configured as a holographic element with a first deflection structure configured to input light which is emitted by the light source and reflected at the person, into the first planar carrier medium, the first planar carrier medium is configured to transmit the light input into the first planar carrier medium from the input coupling region, by internal reflection, to the output coupling region, and the output coupling region is configured as a holographic element with a second deflection structure configured to output the light transmitted to the output coupling region via the first planar carrier medium, which is incident on the second deflection structure, out of the first planar carrier medium, a sensor device configured to capture the light output out of the first planar carrier medium by the output coupling region and to provide the light in a form of sensor data that describe a time of flight of the pulsed light emitted by the light source and reflected at the person, an evaluation device, including a conversion unit and an interpretation unit, configured to convert the sensor data into vibration data using the conversion unit and to provide the speech signal of the person using the interpretation unit which is configured to evaluate the vibration data by applying a speech interpretation criterion, wherein the speech interpretation criterion includes respective vibration data, which are correlated to respective speech signal components which make up the speech signal of the person, and a second planar carrier medium on which a light input coupling region and a light output coupling region are disposed, wherein the light input coupling region is configured as a holographic element with a third deflection structure configured to input light, which is incident on the third deflection structure from the light source, into the second planar carrier medium, the second planar carrier medium is configured to transmit the light input into the second planar carrier medium from the light input coupling region, by internal reflection, to the light output coupling region, and the light output coupling region is configured as a holographic element with a fourth deflection structure configured to output the light transmitted to the light output coupling region via the second planar carrier medium, which is incident on the fourth deflection structure, out of the second carrier medium such that the light is emitted in a direction of the person, wherein the second planar carrier medium is formed separately from the first planar carrier medium and is formed as a transparent film, wherein the second planar carrier medium is disposed on a windshield of the motor vehicle and the first planar carrier medium is formed as a transparent film and is disposed on the windshield directly next to the second planar carrier medium so that the input coupling region partly covers the light output coupling region, or the first planar carrier medium and the second planar carrier medium are formed as a common main carrier medium, on which the input coupling region, the output coupling region, the light input coupling region, and the light output coupling region are disposed, the first planar carrier medium being configured as a transparent plate, film, or lacquer, and the common main carrier medium being disposed at one of the following positions:

in a screen of a display apparatus in the passenger compartment, in a rearview mirror of the motor vehicle, in a combination instrument of the motor vehicle, in the windshield, in a side window of the motor vehicle, or between two A pillars of the motor vehicle.

2. The motor vehicle as claimed in claim 1, wherein the evaluation device is configured to compare the vibration data to reference vibration patterns stored in the interpretation unit to evaluate the vibration data by applying the speech interpretation criterion, and the respective stored reference vibration patterns are assigned to respective speech signals.

3. The motor vehicle as claimed in claim 1, wherein the input coupling region includes at least one first optical grating as the first deflection structure, and the output coupling region includes at least one second optical grating as the second deflection structure.

4. The motor vehicle as claimed in claim 3, wherein the at least one first optical grating includes a volume holographic grating or a surface holographic grating, and the at least one second optical grating includes the volume holographic grating or the surface holographic grating.

5. The motor vehicle as claimed in claim 1, wherein the capture apparatus includes a microphone device configured to capture speech data from the person and provide the speech data to the evaluation device, the evaluation device is configured to provide raw data for the interpretation unit by applying a weighting criterion to the vibration data and speech data, and to provide the speech signal of the person by applying the speech interpretation criterion to evaluate the raw data.

6. The motor vehicle as claimed in claim 1, wherein the capture apparatus includes an image capture device configured to capture ambient light which is incident on the input coupling region from surroundings of the capture apparatus, which is transmitted by the first planar carrier medium to the output coupling region and which is output at the output coupling region, and to provide the ambient light in a form of image data, which correlate with the ambient light, to the evaluation device, and the evaluation device is configured to provide raw data for the interpretation unit by applying a comparison criterion to the vibration data and the image data, and to provide the speech signal of the person by applying the speech interpretation criterion to evaluate the raw data.

7. The motor vehicle according to claim 1, wherein the light source is configured to emit pulsed light in a direction of an anterior neck region of the person.

8. The motor vehicle as claimed in claim 1, further comprising a capture device which includes at least one of a camera device, an acceleration capture device, and a rotation rate capture device, wherein the capture device is configured to provide capture data captured by the capture device to the evaluation device, and the evaluation device is configured to evaluate the capture data to generate the speech signal of the person using the interpretation unit.

* * * * *